United States Patent [19]
Engler

[11] 3,769,729
[45] Nov. 6, 1973

[54] DISPLAY APPARATUS FOR VEHICLE WHEELS

[75] Inventor: Clifford E. Engler, Short Hills, N.J.

[73] Assignee: Gilwin Corporation, Jersey City, N.J.

[22] Filed: May 5, 1971

[21] Appl. No.: 140,475

[52] U.S. Cl. ............................................. 40/129 B
[51] Int. Cl. ............................................. G09f 7/00
[58] Field of Search ...................... 40/129 R, 129 B

[56] References Cited
UNITED STATES PATENTS

| | | | |
|---|---|---|---|
| 1,832,605 | 11/1931 | Zallio | 40/129 B |
| 2,954,629 | 10/1960 | Matin | 40/129 B |

FOREIGN PATENTS OR APPLICATIONS

| | | | |
|---|---|---|---|
| 508,296 | 12/1954 | Canada | 40/129 B |

Primary Examiner—Louis G. Mancene
Assistant Examiner—J. Q. Lever
Attorney—Harry B. Rook

[57] ABSTRACT

A display apparatus includes a main plate of a diameter such that its peripheral edge portion is abuttingly secured to a vehicle wheel rim and on which is rotatably mounted a display disk held by a counterweight against rotation where the wheel is rotating, and a transparent cover for the disk whose edge flange is separably secured to the peripheral edge portion of the main plate.

1 Claim, 5 Drawing Figures

DISPLAY APPARATUS FOR VEHICLE WHEELS

BACKGROUND OF THE INVENTION

1. Field of the Invention

This invention relates to a display apparatus that is adapted to be mounted on a rotating mechanism, particularly a vehicle wheel and includes a unit for displaying an ornament or an advertisement, or the like, which does not rotate with said mechanism but is maintained in a desired relatively stationary position.

2. The Prior Art

Counterweight display disks have been mounted on caps that close the usual hub openings in vehicle wheels, but the prior art structures leave much to be desired in that the disks, and consequently the displays, are too small, the displays cannot be easily and quickly interchanged and the connection and disconnection of the display disk to and from the hub cap is difficult and excessively time-consuming.

SUMMARY

A primary object of the present invention is to provide a display apparatus to be separably applied to a vehicle wheel which overcomes the objections and disadvantages incident to the prior devices and which provides an exceptionally large display disk and can easily and quickly be mounted on and removed from a vehicle wheel by an unskilled person.

Another object is to provide a novel and improved construction whereby the display material such as decalcomania, letters, monograms and ornamental designs can be easily and quickly interchanged on the display disk.

The invention further provides a novel and improved combination of a support plate adapted to be secured at its peripheral edge to a wheel rim, and a display disk rotatably mounted on said support plate concentrically therewith and held against rotation with the plate, a transparent cover for the disk, and common means for separably securing said main plate to the wheel rim and to separably fasten said cover to the outer face of the main plate.

BRIEF DESCRIPTION OF THE DRAWINGS

For a complete understanding of the invention reference should be had to the following description and the accompanying drawings in which:

FIG. 3 is an enlarged fragmentary sectional view of the portion of the apparatus enclosed within the broken line rectangle in FIG. 1;

FIG. 4 is an enlarged fragmentary sectional view of the display disk, the main support plate and the pivotal mounting of the disk on the plate, and FIG. 5 is a detached view of one of the clips for securing the display apparatus on a wheel rim.

BRIEF DESCRIPTION OF THE PREFERRED EMBODIMENTS

Figure 1:
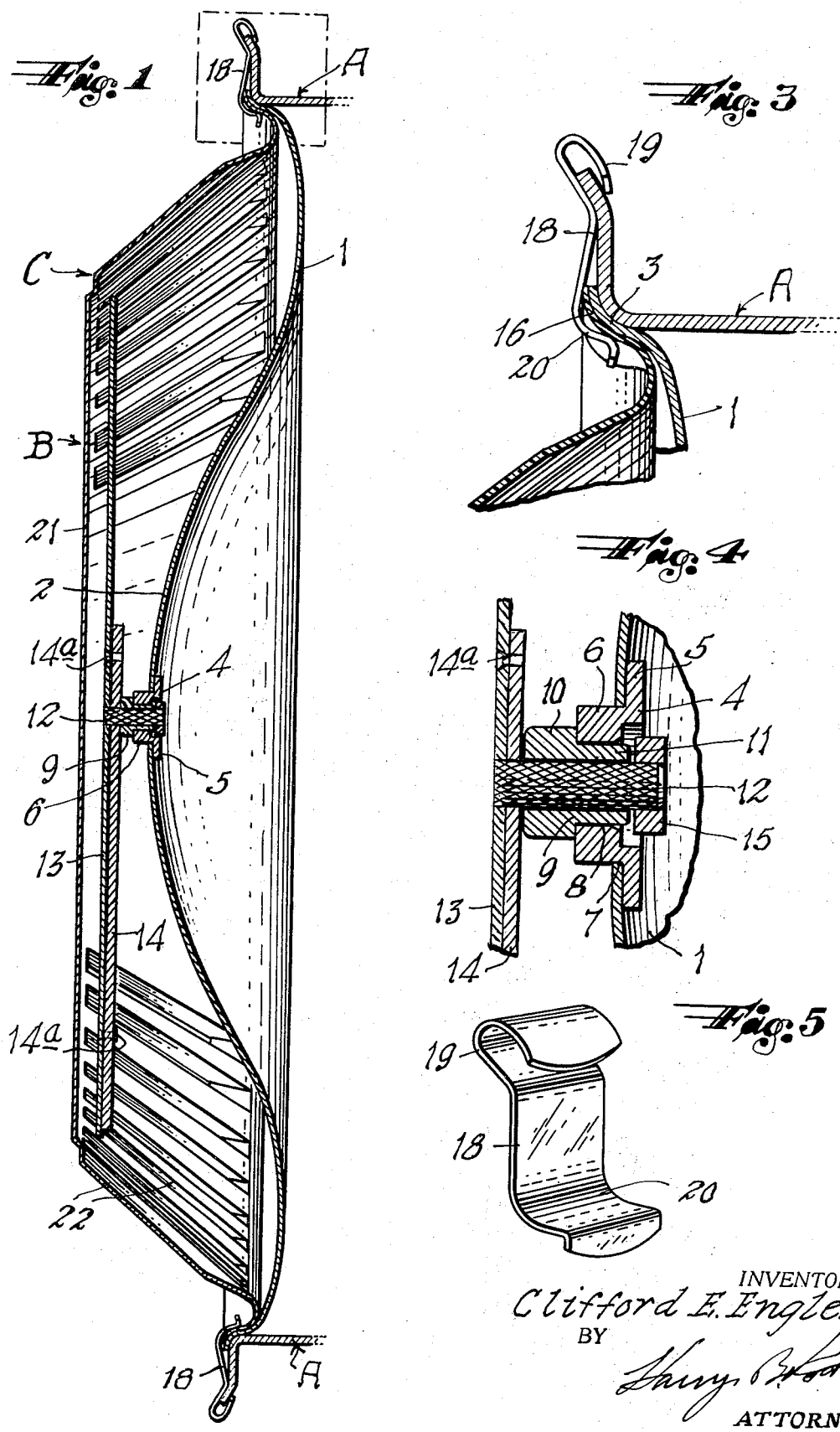
FIG. 1 is a fragmentary central vertical sectional view of a display apparatus embodying the invention, showing it mounted on a vehicle wheel rim which is illustrated fragmentarily.
Figure 2:
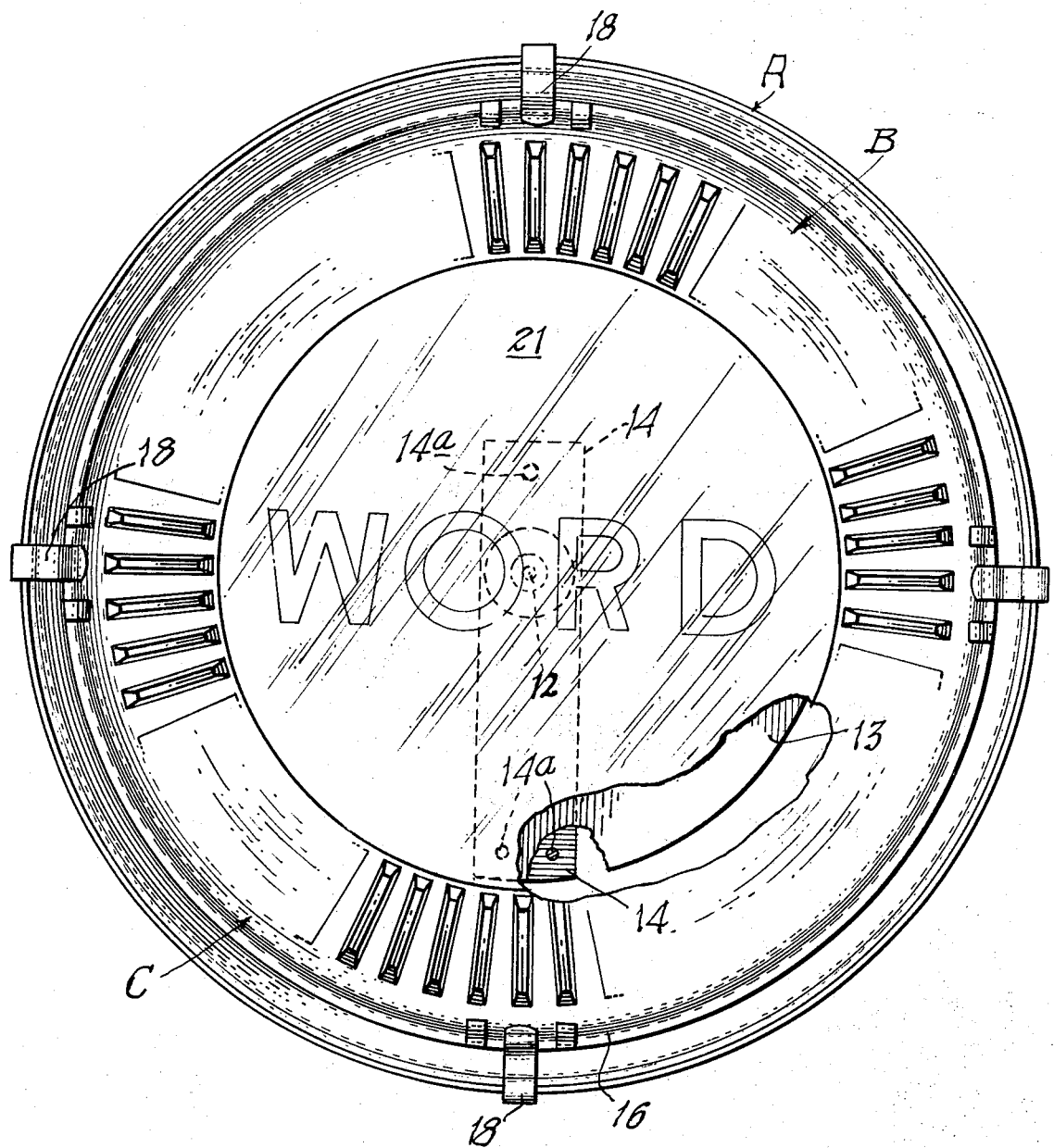
FIG. 2 is a front elevational view of the display apparatus illustrated in FIG. 2.

Specifically describing the invention, the reference character A designates a portion of a known modern type of a vehicle wheel rim on which the usual rubber tire is seated, and the reference character B generally designates the display apparatus.

The display apparatus is shown as comprising a main support plate 1 of a diameter about the same as the wheel rim and having a concavo-convex central portion 2 and a peripheral edge portion 3 transversely curved to conform to and abut the outer surface of the wheel rim.

Secured at the center of the circular main plate is a bearing support element 4, said bearing support comprising a base flange 5 fast secured to the inner side of the plate and from which projects a cylindrical boss 6 which extends through a hole 7 in the main plate. The boss has a central bore 8 in which is secured a bearing bushing 9 which includes a head portion 10 abutting the end of the boss 6 and a neck portion 11 arranged in the bore 8 of the bearing support element. The bushing has an opening therethrough in which is journaled a stub shaft 12 to the outer end of which is secured the display disk 13 and the counterweight 14. At the other end of the stub shaft is a lock washer or nut 15 to prevent displacement of the shaft from the bearing. The counterweight is shown as a rectangular metal bar through which extends the shaft 12 and which is secured to the display disk by rivets 14 a. The major portion of the counterweight is disposed at one side of the axis of the stub shaft 12 so that the counterweight when the stub shaft is horizontally disposed, tends to hold the disk against rotation with the main plate.

In accordance with the invention suitable display material such as designs, decalcomania, ornaments, and the like are attached to the face or front side of the display disk, and as shown the disk bears the display constituting "WORD." The display disk and the display material carried thereby are enclosed and protected against injury by a dished transparent cover C preferably formed of synthetic material. The cover has a peripheral edge flange 16 approximately corresponding in cross-sectional shape to the peripheral edge portion 3 of the main plate, and preferably the main plate is separably secured to the wheel rim, and the cover C is separably secured to the main plate so that at least the cover can be easily and quickly removed for interchange of the display material on the disk.

While any suitable means may be utilized for securing the main plate and the cover to the wheel rim and to each other, it is desirable to have common means which in the present instance is shown as a plurality of spring clips 18 each of which has a hooked end 19 to frictionally span and grip the edge of the wheel rim. The other end 20 of each of the clips has an ogee curve to frictionally grip the edge portion of the main plate and the peripheral edge flange of the cover between the clip and the wheel rim. The clips can be easily manually snapped on to and removed from the rim in spaced relation circumferentially of the rim with the requirement of only minimum skill and minimum expenditure of time.

The dished cover is mounted with its concave side in spaced and juxtaposed relation to the disk so as to enclose the disk between the main support plate 1 and the cover, and preferably the central portion of the cover is flat and transparent as indicated at 21, while the frusto-conical portion of the cover may be ornamented in suitable manner, as with a plurality of rectangular projections 22 some of which are omitted for simplicity of illustration.

In use of the apparatus, it will be readily understood that the display can be easily and quickly connected to and disconnected from the wheel rim; the display material can be easily and quickly changed, and when the apparatus is mounted on a wheel, the counterweight will hold the disk against rotation with the main support plate so that the design material will always be properly positioned with respect to the observer.

The concavo-convex support 1 provides a strong support for the disk, and the apparatus also provides an attractive cover to conceal the usual hub opening of the vehicle wheel.

I claim:

1. A display apparatus including a vehicle wheel which has a rim, a circular main plate having a diameter and a peripheral edge portion of a shape to adapt the plate to be secured to said wheel rim with said peripheral edge portion concentric with and in juxtaposed abutting relation to said wheel rim, a display disk, coacting means on said plate and said disk to mount the disk on the outer face of said plate for rotation concentrically therewith, there being means holding the disk against rotation when the wheel is rotating, a transparent cover for said disk having a peripheral edge flange of a diameter and cross-sectional shape corresponding to said peripheral edge portion of said plate, said peripheral edge portion of said main plate and said peripheral edge flange of the cover being transversely curved correspondingly to the wheel rim to firmly abut said rim and each other, and means securing said main plate and said cover to said wheel rim comprising a plurality of identical spring clips spaced apart circumferentially of the wheel rim, each having one end portion separably and yieldingly hooked over the edge of said wheel rim and having its other end portion curved and yieldingly abutting said peripheral edge flange of the cover, said means holding the main plate and cover in position on the wheel rim with the peripheral edge portion of said main plate abutting said rim and said peripheral edge flange of the cover abutting said peripheral edge portion of the main plate so that said disk is enclosed between the main plate and the cover.

* * * * *